F. D. KEERAN.
DIFFERENTIAL FOR AUTOMOBILES.
APPLICATION FILED APR. 26, 1915.
1,191,433.
Patented July 18, 1916.
2 SHEETS—SHEET 1.
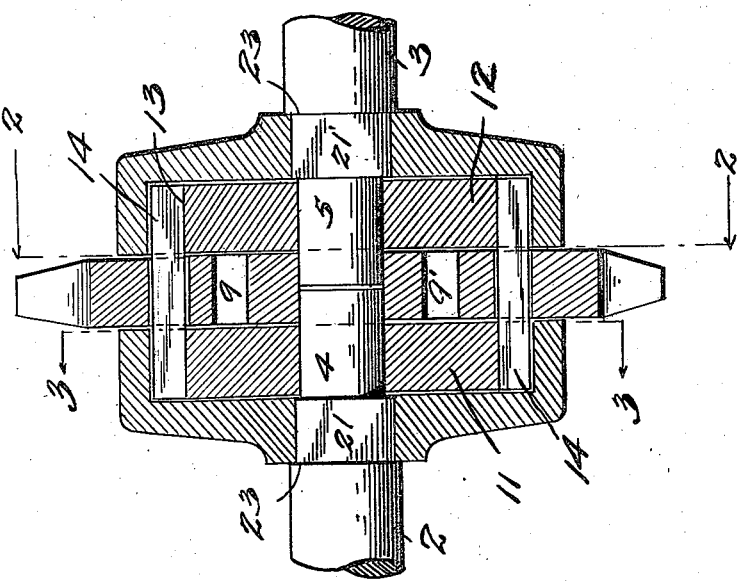
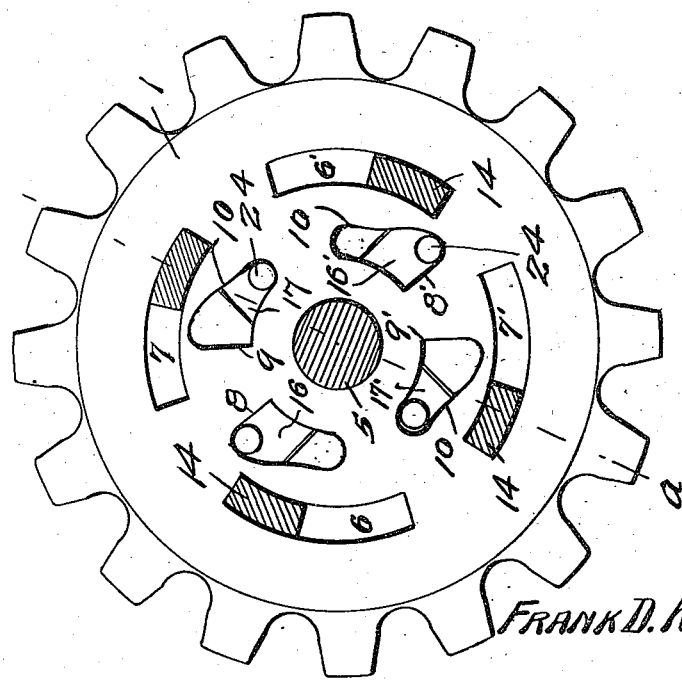
Inventor
FRANK D. KEERAN
By Herman A. Phillips
Attorney

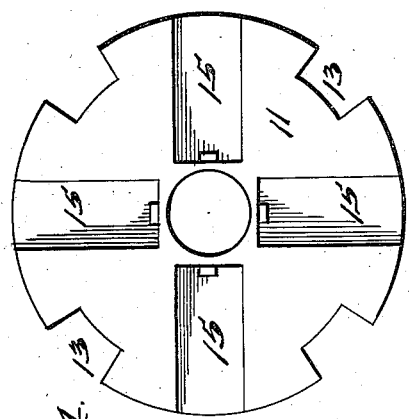
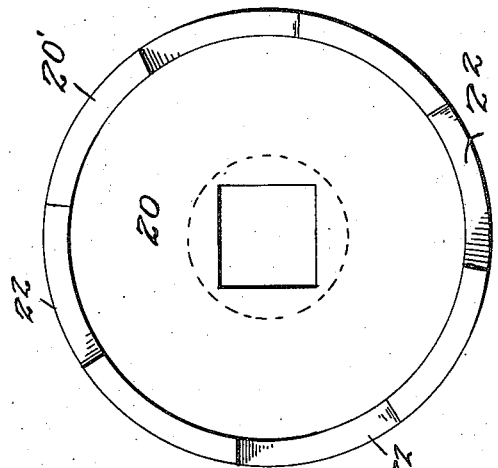
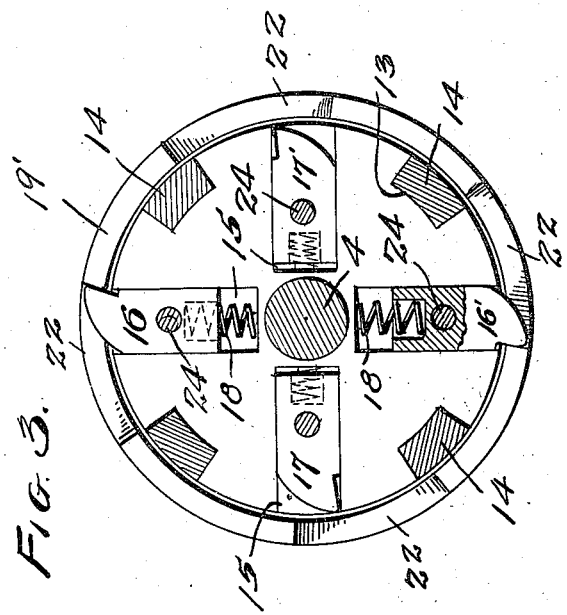

UNITED STATES PATENT OFFICE.

FRANK DOUGLAS KEERAN, OF RED BLUFF, CALIFORNIA.

DIFFERENTIAL FOR AUTOMOBILES.

1,191,433.   Specification of Letters Patent.   Patented July 18, 1916.

Application filed April 26, 1915. Serial No. 24,177.

*To all whom it may concern:*

Be it known that I, FRANK DOUGLAS KEERAN, a citizen of the United States, residing at the city of Red Bluff, in the county of Tehama, State of California, have invented certain new and useful Improvements in Differentials for Automobiles, of which the following is a specification, reference being had to the accompanying drawing.

The present invention relates to an improved differential gear for automobiles, and is designed particularly to provide a differential gear by means of which an increased power may be applied to the driving axle or shaft, by which friction and wear may be diminished, and economy attained in the construction and operation of such devices.

The invention consists in certain novel combinations and arrangements of parts as hereinafter described and claimed.

In the accompanying drawings I have illustrated one complete example of the physical embodiment of my invention constructed according to the best mode I have so far devised for the practical application of the principles of my invention.

Figure 1 is a vertical central sectional view of the gearing constructed according to my invention, line *a—a* Fig. 2. Fig. 2 is a sectional view of Fig. 1 on line 2—2. Fig. 3 is a vertical sectional view of Fig. 1 on line 3—3. Fig. 4 is a face view of one of the coupling disks. Fig. 5 is a face view of one of the driving cups.

In the preferred embodiment of my invention as illustrated in the drawings I have employed a sprocket wheel 1 which is driven from the motor in usual manner by the sprocket chain (not shown) to revolve the sectional driving shaft whose members are indicated by the numerals 2 and 3. The sprocket wheel is loose on the shaft ends 4 5 of the shaft, and may oscillate within limits on these journal ends. For this purpose the wheel is provided with four circumferential slots as 6 6' and 7 7' arranged in pairs located diametrically opposite each other as seen best in Fig. 2. A second series of openings are provided in the wheel, and arranged in pairs as indicated at 8 8' and 9 9', and each of these slots is formed with a cam face as 10. It will be understood from the drawings that all of the slots or openings in the body of the sprocket wheel extend entirely therethrough and open at both sides of the body of the wheel.

At opposite sides of the sprocket wheel and loosely mounted on the rounded journal ends 4 5 of the driving axle are located a pair of driving disks as 11 and 12 each of which is provided with four slots 13 in its periphery and these series of slots are provided to receive the ends of four transversely arranged locking keys as 14, 14. By this arrangement the two driving disks are connected to move in unison and therefore revolve synchronously on their bearings. The keys 14 extend through the slots 6 6' 7 7' and it will be noted that this key and slot construction permits independent movement of the sprocket wheel and disks within the limits of the slots in the wheel.

Each disk is provided with four radially arranged diametrically extending grooves 15 fashioned on its inner face and these grooves which are open at the periphery of the disks accommodate two pairs of spring pressed pawls as 16 16' and 17 17'. There are in all eight of these pawls, one set of four for each disk, and they are each urged outwardly by a spring 18 located between the base or inner end of the pawl and the wall of the slot 15.

The disks 11 and 12 are incased by a coupling cup 19 or 20, and these cups are fitted on the squared portions 21 21' of the axle to revolve and they revolve with the axle. The flange 19' or 20' of the cups is grooved as at 22, there being eight grooves in all, and arranged diametrically to permit the projection thereinto of the pawls carried by the coupling disks. The cups 19 20 are held in place by the shoulders 23, 23 on the shaft sections and it will be seen that they completely cover the coupling disks 11 and 12; the sprocket wheel being of greater diameter however is of sufficient size to permit the sprocket chain to pass around the device.

The pawls are actuated in pairs, and for this purpose, each pawl is provided with a pin as 24 projecting outwardly therefrom at the sprocket wheel side of each disk, and each pin projects into one of the cam slots of the sprocket wheel. The pins are a little less in length than one half the thickness of the wheel so that a pair of pins project into each of the four cam slots *i. e.* a pin from each side of the wheel, and these pins are adapted to contact with and slide or ride along the cam wall 10 of the slots.

The keys 14 are fixed to each disk so that the two joined disks and keys form practically a cage for the sprocket wheel, the latter however being permitted an independent movement within the limits of the slots 6 6' 7 7'.

The *modus operandi* of the gear will be evident upon an inspection of the drawings. In Fig. 3 the pairs of pawls 16 16' are driving the axle forward. These pawls are in extended position, a pair of pawls at each side of the wheel and their ends are engaging the forward walls of the slots 22 in the cups 19 and 20 so that the automobile to which the parts are attached is being driven forward. The pawls are moved to extended position by the action of the sprocket wheel which revolves its cage through the locking keys and as the pins 24 are free to travel over the cam faces in slots 8 and 8' the pawls 16 16' are forced outwardly into operative position by their springs. In this manner four pawls are made to engage the two cups, and four pawls are held in inoperative position by the other pairs of cam slots. To reverse the movement of the shaft, the rotary movement of the sprocket wheel is reversed; the keys travel backward in their slots; the pins of the extended pawls are forced in by the cam edges of the slots 8 8' and the cam edges of the slots 9 9' permit the springs to force the pairs of pawls 17 17' outwardly into position so that they will engage the slots in the cups and through the medium of the squared portions of the shaft sections, the shaft is revolved in reverse direction. By this means four pawls are projected for forward movement and four additional pawls are projected for reverse movement.

While I have illustrated a sprocket wheel as the driven member, it will be understood that a worm gear or other toothed gear and pinion may be used if desired, and other changes made within the scope of my claim without departing from the spirit of my invention.

What I claim is:—

The combination in a differential gearing with a driving wheel having elongated slots and cam slots, and coupling disks at the sides of the wheel having radially movable pawls with pins in the cam slots, of keys passed through the elongated slots and attached to the disks, shaft sections supporting the disks and wheel, and a cup revoluble with each shaft section provided with slots for the accommodation of the pawls.

In testimony whereof I hereunto affix my signature in the presence of two witnesses.

FRANK DOUGLAS KEERAN.

Witnesses:
FRED HOLLISTER,
A. H. DERBYSHIRE.